United States Patent [19]

Lechnir

[11] Patent Number: 4,895,097

[45] Date of Patent: Jan. 23, 1990

[54] TIRE DEFLATION INDICATOR

[76] Inventor: Alfred M. Lechnir, P.O. Box 6917, Gulfport, Miss. 39503

[21] Appl. No.: 254,241

[22] Filed: Oct. 6, 1988

[51] Int. Cl.$^4$ ............................................. B60C 23/08
[52] U.S. Cl. .................................. 116/34 R; 116/28 R
[58] Field of Search ................ 116/28 R, 28 A, 34 R, 116/34 A, 34 B, 303, 173, 175

[56] References Cited

U.S. PATENT DOCUMENTS

| | | | |
|---|---|---|---|
| 663,761 | 12/1900 | Johnson | 116/173 |
| 2,091,101 | 8/1937 | Moss | 116/34 R |
| 2,636,303 | 4/1953 | Feigley et al. | 116/173 |

FOREIGN PATENT DOCUMENTS

| | | | |
|---|---|---|---|
| 448013 | 1/1913 | France | 116/34 R |
| 1203449 | 1/1960 | France | 116/28 R |
| 302208 | 10/1932 | Italy | 116/34 R |

Primary Examiner—William A. Cuchlinski, Jr.
Assistant Examiner—W. Morris Worth
Attorney, Agent, or Firm—Alexander F. Norcross

[57] ABSTRACT

An apparatus for visually indicating to a driver of a towing vehicle the deflation of a pneumatic tire on the towed vehicle. A base member is mounted to the body of the towed vehicle in the proximity of the tire. A spring arm having a rotatable signal device of contracting colors is pivotally attached at one end to the base. A clip for releasably retaining the spring arm in a downward position in close proximity to the surface of the roadway is also attached to the base. Upon deflation of the tire the tip of the spring arm contacts the surface of the roadway which causes the spring arm to be released from the clip and move into a signaling position, extending outwardly from the towed vehicle and perpendicular to the direction of travel.

8 Claims, 2 Drawing Sheets

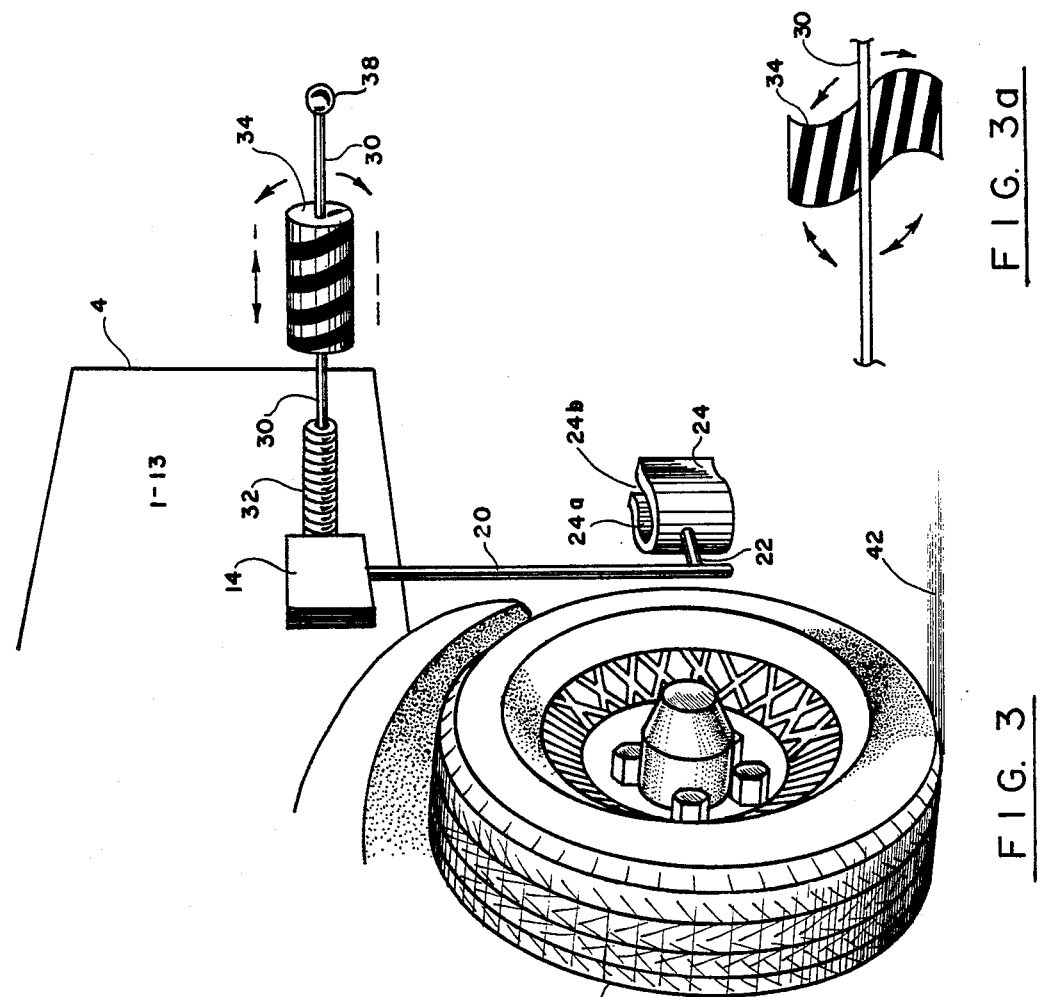
FIG. 3
FIG. 3a
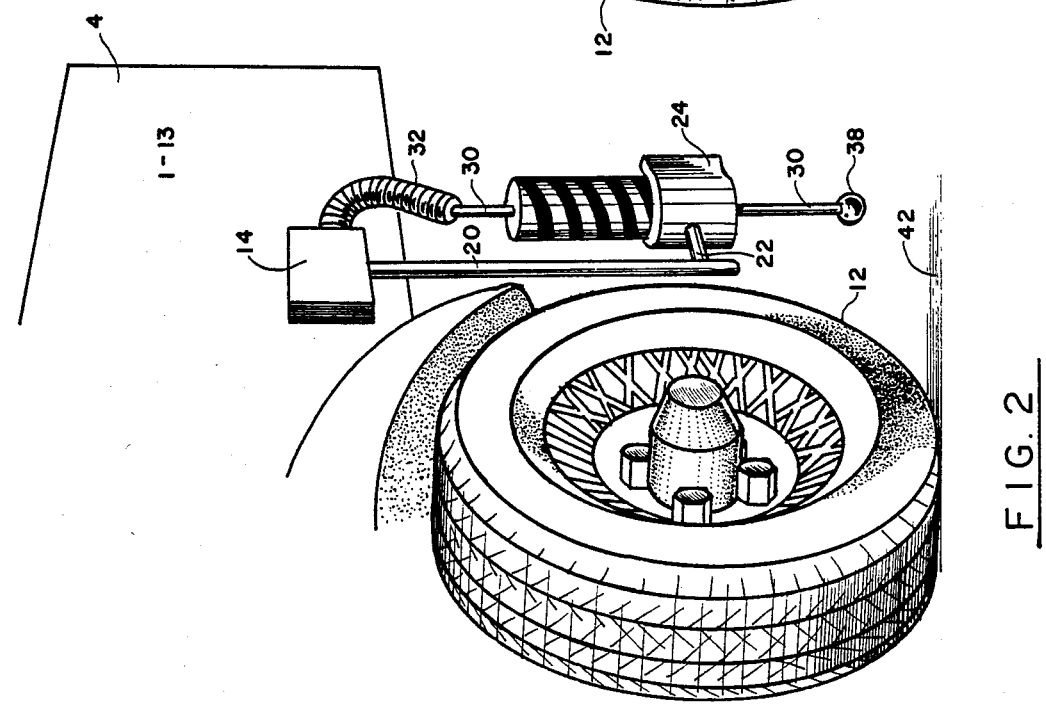
FIG. 2

TIRE DEFLATION INDICATOR

BACKGROUND OF THE INVENTION

This patent relates to the field of devices for indicating loss of pressure and imminent failure of pneumatic tires in vehicles.

U.S. Pat. No. 2,686,493 shows, mounted to the fixed axle portion of the vehicle, at the axle-leaf spring connection, a sounding wire, consisting of a curved wire extending vertically downward to make a resonant sound through the frame of the vehicle upon contact to the wire with the ground.

This is extended by U.S. Pat. No. 2,794,411, which improves this concept by providing a resonator, a metal cup and an adjustment mechanism for varying and fixing the length of the contact wire.

Another ground contact detector is a sound generating device which is wheel mounted. Reeder U.S. Pat. No. 1,601,604 to Reeder shows an attachment in the hubcap of the vehicle in which a single striker mechanism is depended radially outward along the wheel of the vehicle. Contact with the ground causes it to strike and ring an internal bell mechanism.

U.S. Pat. No. 1,785,614 is typical of the majority of patents for tire pressure loss detectors in that it utilizes a mechanism physically mounted upon the wheel which responds to the outward expansion of a tire carcass during deflation. All such patents, of course, represent mechanisms whose behavior cannot be predicted in the event of a sudden failure, such as a blowout, with the attended collapse of the tire structure. Boyer shows a spring supported mechanism which is triggered from an inner to an outer position, if the tire wall extends to an outward point. The outward motion is not visually detectable but is rather used to trigger a microswitch creating an electrical signal for an electric signaling circuit.

U.S. Pat. No. 902,693 is an earlier mechanism for responding to the outward expansion of the tire. A spring loaded arm swings to an outward position to create a sound signal by striking against a vibrating member located on the frame of the vehicle.

U.S. Pat. No. 1,947,760 is a frame rather than wheel mounted deflection indicator of this basic type; the outward deflection of the tire pulls a cable mechanism which then triggers a mechanical sensor. This device is mounted upon the fixed portion of a brake drum of a car, and it would appear to be subject to high failure rate in the event of a strike by road debris and the like.

U.S. Pat. No. 2,917,020 shows an alternate form: a hubcap mounted sound alarm in which spring wires within a hubcap are set so that they will strike the ground during deflation, creating a ringing effect on the hubcap. An apparently unpatentable version is shown in FIGS. 8 through 9, which appear to be a duplicate of an earlier patent to Neiswanger.

U.S. Pat. No. 3,937,542 shows an electric low pressure sensor with indicator in which an electric pressure sensor is mounted within the valve stem of a tire and coupled to a motor vehicle indicator mounted through an insulated slip spring and brush mechanism on the frame of a car.

Perry U.S. Pat. No. 3,742,896 discloses a pneumatically actuated signal flag mounted upon the axle hub of a vehicle and responsive to the pneumatic pressure to indicate a low pressure condition in a vehicle tire.

SUMMARY OF THE INVENTION

This is a device for detecting the existence of a flat tire on a towed trailer. In one form, the device consists of an attachment means, fastened to the frame of the trailer adjacent each wheel. A spring loaded rod, having a normal horizontal extending position extends outward, perpendicular to the side of trailer frame, from the attachment means. The rod is bent down at its point of attachment against the spring load and held within a clip, similar in shape to a fuse clip.

This clip restrains the tendency of the rod to spring sideways, as induced by the spring force, but permits relative rearward motion of the rod, which would free it from the clip. The rod itself is of a length such that it will not contact the ground adjacent the wheel during normal deflection of the trailer suspension, but will contact the ground if the trailer wheel should lose pressure or blowout.

In the preferred embodiment a rotating brightly colored or reflective sleeve is provided on the rod. In the stowed position the sleeve is slid along the rod and held above the retaining clip; when the rod deploys, the sleeve is forced to the outer periphery where it spins as a visual attention gathering device. When used on a trailer, the sleeve will reflect the towing vehicle's tail lights, and will be readily visible at night.

In typical use, the invention is mounted on a trailer or towed vehicle. Should a trailer tire become flat, the bottom tip of the suspended rod will contact the ground and be forced backward, freeing it from the clip. The normal spring tension will then cause it to extend horizontally outward where it will become visible in the rear view mirrors of the vehicle pulling the trailer, indicating a sudden tire failure.

Normally the driving characteristics of small trailers behind an automobile are such that there is no perceptible noise or vibration level when a tire fails. This can produce an extremely dangerous situation resulting in wheel destruction and collapse of the trailer suspension system with resulting out-of-control motions and an accident.

A more dangerous situation exists in the common practice of towing automobiles behind motor homes and the like. The typical motor home, house trailer or moving van averages eight feet in width; the typical automobile is six feet wide. As a result, an automobile towed behind a motor home or a moving van is invisible in the rear view mirrors, even when extended "west coast" mirrors are used. It is impossible for the driver to observe the condition of the tires on the towed automobile, and equally, the driver will have no indication as to a flat tire or tire failure on the automobile from either sight or sound. This inventive device creates a signal which can, by its design, extend into the field of visibility of the driver giving an indication of tire failure where no indication otherwise exists.

The device, by indicating contact with the ground, indicates that something has failed in the tire permitting the driver to pull over and stop and make necessary repairs before a structural failure occurs to the trailer.

It is thus an object of this invention to disclose a pneumatic tire failure signal which is particularly suitable for use upon towed trailers.

It is a further object of this invention to disclose a pneumatic tire failure signalling device which does not depend upon noise for its signalling function.

It is a further object of this invention to disclose a pneumatic tire failure device which is capable of use in conditions of high ambient noise level, or of noise masking.

It is a further object of this invention to disclose a pneumatic tire failure signalling device which is of relatively simple and inexpensive construction.

It is a further object of this invention to disclose a pneumatic tire failure signalling device which is capable of being rapidly installed upon or removed from a trailer as required for use.

This and other objects of the invention may be more clearly seen from the detailed description of the preferred embodiment which follows.

BRIEF DESCRIPTION OF THE DRAWINGS

FIG. 2 is a pictorial depiction of the invention in an undeployed, cocked position.

FIG. 3 is a pictorial depiction of the invention in a deployed, signaling position.

FIG. 3A is a view of an alternate, propeller form of the rotation signal of the invention.

DETAILED DESCRIPTION OF THE PREFERRED EMBODIMENT

Figure 1:
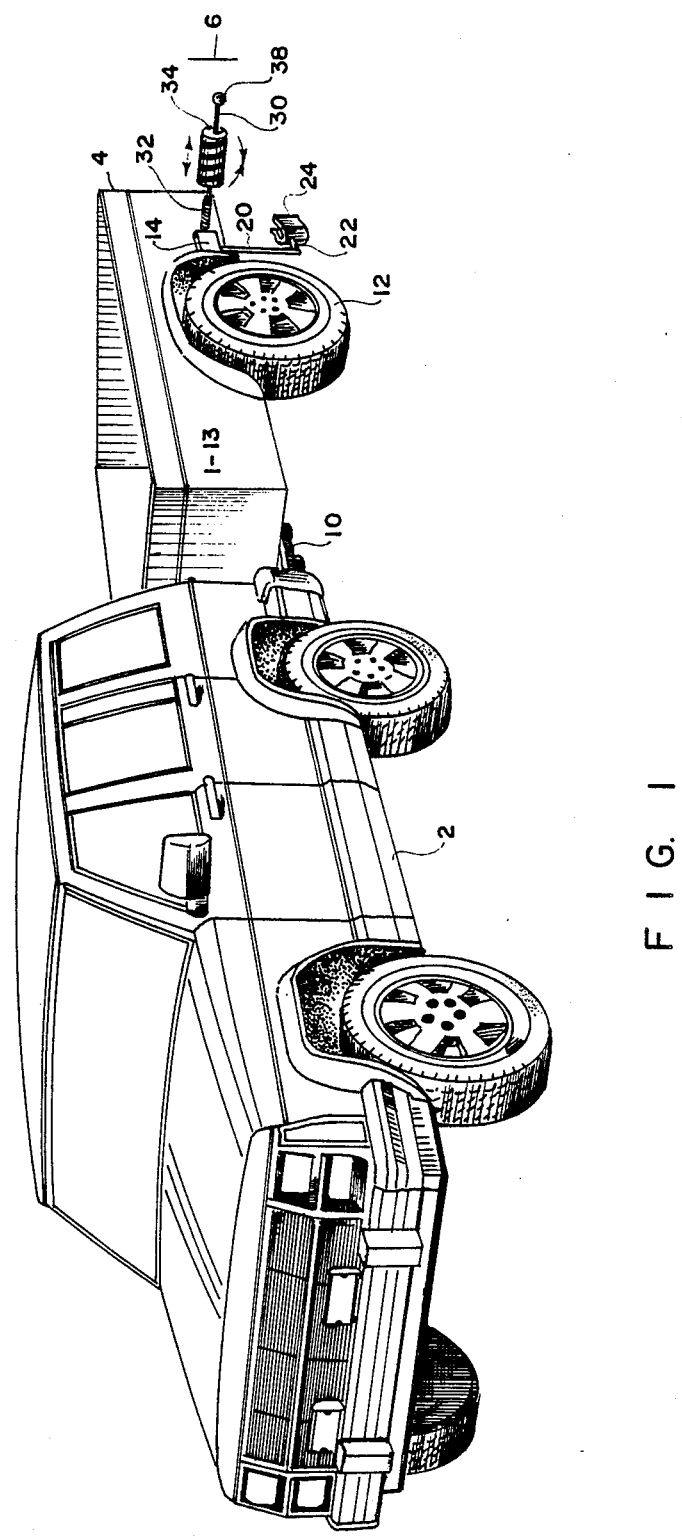
FIG. 1 is a pictorial view of the invention as installed upon a towed trailer, in the stowed position.

Referring to FIG. 1, FIG. 1 shows a typical automobile 2 towing a typical trailer 4 in tandem arrangement with the inventive low tire signal 6 installed on the trailer.

It should recognized that standard automobile design for air-conditioned automobiles 2 is that they are designed to have their windows usually closed for increased aerodynamic efficiency and reduced fuel consumption. There is thus little audible sensation from the operation of the trailer 4.

Further, it is well known that a trailer 4 is typically fastened to an automobile through a freely moving hitch 10 (not shown), usually of a ball and pintle design, well understood in the art, to provide for the ease and articulation of movement between the automobile and the trailer. As a result, there is substantially no mechanical coupling between the trailer 4 and the automobile 2 capable of passing any substantial variation in noise or vibration of the trailer 4 to the frame of the automobile 2. Only if the trailer 4 were actually to go out of control would perceptible forces be felt by the driver of the automobile.

Trailer 4 is typically equipped with at least one dual set of pneumatic wheels 12 of standard design, spring loaded to support the trailer and its load in towing. The integrity of these wheels is critical to the mechanical stability of the trailer.

While it is well known that total loss of a wheel may produce an out of control condition for a and quite possibly for the automobile as well, a more common hazard results from the susceptibility of a pneumatic tire to excessive heat buildup when it is underinflated. This can produce and does produce a tire blowout. Trailers, which tend to be less heavily loaded, run an additional risk in that the heat buildup in an underinflated tire can produce an actual fire within the wheel. This is especially critical if the trailer is towing any flammable load; typical such loads include house trailers, which typically have butane or propane tanks, or boat trailers which will typically include a boat having gasoline or diesel fuel in tanks.

Referring to FIG. 2 and FIG. 3, the invention 6 can be seen to be mounted to the side wall 13 of the trailer by base mount plate 14. Base 14 may be a fixed plate (bolted or welded or adhesively fastened) to the trailer, but preferably is an magnetic mount with a friction face. Such mounts are well understood in the art, being widely used in radio antennas on automobiles, and can be readily designed to support in a fixed position the inventive signal 6.

Extending downward from the base mounting plate 14 is a signal clamp bar 20 supporting a rearward extending clamp arm 22 at the end of which is a U-clamp 24. In form, U-clamp 24 is preferably any spring action clamp having a wider base opening 24a and a narrower throat 24b. Electric cartridge fuse clamp is an ideal shape for U-clamp 24. The opening 25 of clamp 24 faces rearward with respect to the direction of travel of the trailer when normally towed.

A signal arm 30 is mounted to base 14 through spring 32. Journaled around signal arm 30 is a rotating signal 34; in one embodiment rotating signal 34 is a cylindrical tube slightly larger than the diameter of signal arm 30, but of a sufficiently small diameter that it can be retained by signal arm tip 38. In a second embodiment, rotating signal 34 is a curved, propeller type spinner, journaled upon signal arm 30, but having a sufficient surface for marking with visibility enhancing markings, such as contrasting stripes or reflective markings.

Rotating signal 34 is preferably marked or striped with contrasting, preferably highly reflective colors.

In use, base 14 is mounted on a trailer sidewall so as to position the tip 38 of signal arm 30 a distance above ground level 42 sufficient to clear the ground during normal operation of the trailer, but close enough to the ground that reduction of the effective diameter of the tire through loss of pressure will cause tip 38 to strike ground 42.

Inasmuch as signal arm 30 is retained in a rear opening clamp 24 by the sideways spring force of spring 32, it will normally be held in a downward position. The rotating visual signal 34 will be clamped against motion by being slid upward against the spring 32 and held there along vertical distance between spring 32 and the open ended clamp 24. However, in forward motion, should the tire lose pressure and the tip 38 strike the ground, the striking force upon tip 38 would be in a rearward direction, towards the open throat of signal arm clamp 24, forcing the signal arm 30 out from the clamp 24. Once released from the restraint of the clamp 24, signal arm 30, by the force of spring 32, will spring into an outward horizontal position extending sideways, substantially perpendicular from the sidewall of the trailer. The rotating signal 34, is also freed, and would begin to spin because of the combined force of the vibration of signal arm 30 at its free end and by the impinging force of air. In addition, the vibration of the signal arm would force the rotating signal to the outer end of signal arm 30 where it will be retained by bumping contact with tip 38.

This places the signal 34 in the direct line of vision of any rear view mirror 50, and horizontally at a height within the principal line of vision of a driver looking rearward into traffic. It is found that for a driver with typical vision, the rotating motion of the visual signal 34, augmented by the effect created by moving alternating contrasting colors, would be readily visible in the peripheral vision of the driver and would rapidly attract his attention to the signal 34. Signal 34 will be illuminated by the tail lights of the towing vehicle at night, giving day or night visibility. Additionally, as arm 30 extends horizontally a significant distance from the trailer, signal 34 will be visible even where the trailer is not visible, as in an automobile towed behind a motor home or moving van. This is considered to provide a more positive signal indication than any of the current noise making signal indicators, which typically will not be heard in a modern automobile when installed upon a trailer.

FIG. 3A shows an alternate form of the rotating signal 34, in which the signal is formed as a curved, propeller shape. Any similar shape known to have advantageous properties for being rotated by air flow would be suitable. The only structural limitation is that the rotating signal 34 should be of a type that can be held in a non-rotating position above clamp 24 when the signal 6 is in the cocked position, and that the rotating signal 34 should have adequate surface area for marking with contrasting or reflective visibility enhancers. Rotating signal 34 must be loosely journaled about rod 30 so that it will be free to rotate and so that it will, by rotation and vibration, slide to the outer end of rod 34, proximate tip 38. Vibration of the signal rod 30 will insure that this slide action occurs so long as the rotating signal 34 does not bind, from being too tightly journaled about rod 30.

The invention is also free of any likelihood of failure due to loss of electricity or electric signals and does not require signal cables between the trailer and the automobile or modification of the automobile to install any sort of signal panel. Further, when a magnetic base is used for the signal, the signal may be readily moved to a rental trailer or the like, and thus is easily installed as an add-on accessory by an owner.

It should thus be apparent that the invention extends not just to the specific embodiment shown but to that wider class of mechanical signals as are stated in the claims.

I claim:

1. An apparatus for visually indicating to a driver of a towing vehicle deflation of a pneumatic tire on a towed vehicle having a frame positioned a distance from a roadway when said pneumatic tire is inflated comprising:
   (a) mount means affixed to said frame;
   (b) elongate signal carrying means, attached to said mount means having a first position substantially perpendicular to said frame, sideways to the direction of travel of said vehicles, and having a second, deflected position, proximate to but spaced a second distance from said roadway when said tire is inflated;
   (c) means for urging said signal carrying means from the second position to the first position;
   (d) means for retaining said signal carrying means in said second position, releasing said signal carrying means to said first position upon contact of said signal carrying means with said roadway.

2. An apparatus for mounting upon a vehicle traveling over a road surface to detect loss of pressure within a supporting inflated pneumatic tire thereof, comprising:
   (a) a mounting plate affixed to an outer surface of said vehicle;
   (b) a signal arm affixed to said mounting plate having a first position substantially horizontally extended from said vehicle and visible to a driver of said vehicle, perpendicular to the direction of travel of said vehicle, and having a second downwardly extending position, proximate to said road surface;
   (c) means for urging said signal arm to said first position;
   (d) restraining means affixed to said mounting plate for strongly restraining said signal arm in said second downwardly extending position against sideways motion, but releasably restraining said signal arm against rearward motion;
   (e) said signal arm in said second downwardly extending position being mounted a distance clear of said road surface when said pneumatic tire is fully inflated, said signal arm coming into contact with said road surface when said pneumatic tire deflates.

3. The apparatus of claim 2 above, where said mounting plate is a magnetically affixed plate.

4. The apparatus of claim 2 above, wherein said mounting plate is an adhesively affixed plate.

5. The apparatus of claim 2 above, wherein said signal arm further comprises:
   (a) a rotating signal means journaled upon said arm;
   (b) said signal means having contrasting visual indicia thereupon; and
   (c) means for retaining said rotating signal means upon said signal arm when said signal arm is in said first position.

6. The apparatus in claim 2 above, wherein said means urging said signal arm comprises a spring section, affixed at a first end to said plate and affixed at a second end to a rod section of said signal arm.

7. The apparatus in claim 5 above, wherein said means urging said signal arm comprises a spring section, affixed at a first end to said plate and affixed at a second end to a rod section of said signal arm.

8. An apparatus for signalling loss of pressure within a pneumatic tire supporting a vehicle a distance above a road surface comprising:
   (a) a removably affixable plate for mounting upon the frame of said vehicle proximate said tire;
   (b) an elongate spring section affixed at a first end to said plate extending in a first position substantially perpendicular to the direction of travel of said vehicle;
   (c) a signal rod section affixed to a second end of said spring section terminating in a tip end thereof;
   (d) visual signal means, movably retained upon said rod section between said spring section and said tip;
   (e) a clip affixed to said plate, extending in direction towards said road surface, retaining said signal rod section in a downward direction, proximate said road surface, said signal rod section being free to move from said clip upon application of a force from contact of said tip with said road surface;
   (f) said plate being positioned such that, when said rod is restrained within said clip, said tip is positioned at a point distanced from said road surface when said pneumatic tire is inflated and in contact with said road surface when said pneumatic tire is deflated.

* * * * *